United States Patent [19]

McCue

[11] Patent Number: 4,729,157

[45] Date of Patent: Mar. 8, 1988

[54] WHEEL PULLER

[75] Inventor: Alfred D. McCue, Abingdon, Va.

[73] Assignee: Ingersoll-Rand Company, Woodcliff Lake, N.J.

[21] Appl. No.: 908,168

[22] Filed: Sep. 17, 1986

[51] Int. Cl.[4] .............................................. B23P 19/04

[52] U.S. Cl. ...................................... 29/426.5; 29/259; 29/263; 29/273; 254/104; 269/234

[58] Field of Search ............. 29/273, 263, 259, 426.5; 254/104; 269/234

[56] References Cited

U.S. PATENT DOCUMENTS

| | | | |
|---|---|---|---|
| 1,229,725 | 6/1917 | Dominguez | 29/264 |
| 1,305,322 | 6/1919 | Towler | 29/273 |
| 1,427,976 | 9/1922 | Skiles | 29/264 |
| 1,527,975 | 3/1925 | Grover | 29/264 |
| 1,544,331 | 6/1925 | Malmgren | 254/104 |
| 1,552,912 | 9/1925 | Colt | 254/104 |
| 1,590,973 | 6/1926 | Grover | 29/264 |
| 1,750,840 | 3/1930 | Grover | 29/264 |
| 3,734,549 | 5/1973 | Loov | 254/104 |

*Primary Examiner*—P. W. Echols
*Attorney, Agent, or Firm*—D. W. Tibbott

[57] ABSTRACT

A wheel puller for use on large wheel and tire assemblies has a plate adapted for attachment to a tire rim. A back plate is spaced apart from this plate and extends across the axis of the wheel hub. Two wedge blocks are placed between the back plate and the wheel hub on either side of the center line of the wheel hub. A driving wedge is inserted between each wedge block and the back plate.

In the process of using the wheel puller, the driving wedges are alternately tapped with a light hammer to pull the rim away from the hub. If necessary wedging spacers may be inserted between the driving wedges and the backplate to increase the distance that the wheel rim may be driven off the hub.

12 Claims, 4 Drawing Figures

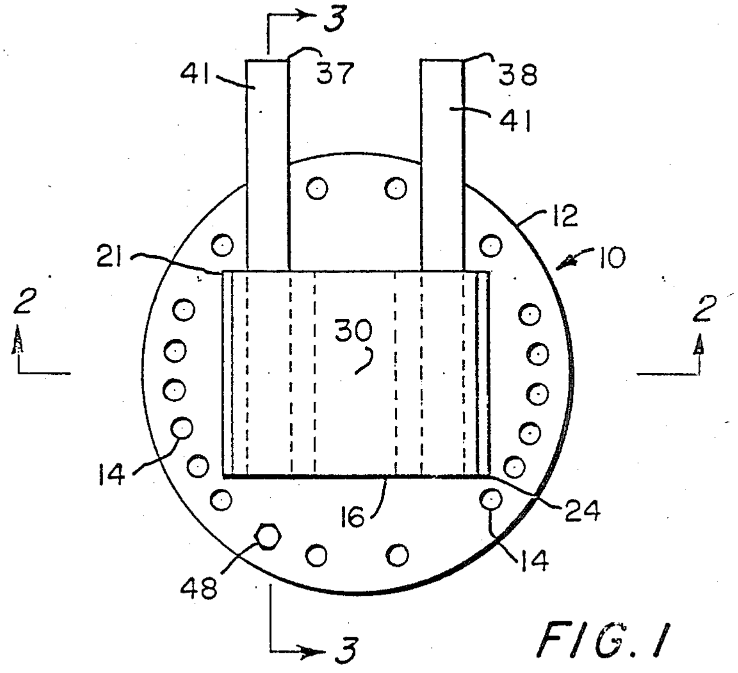
FIG. 1
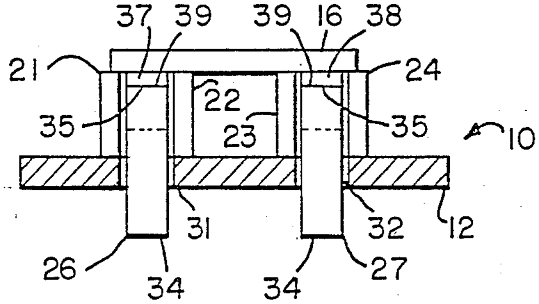
FIG. 2
FIG. 3
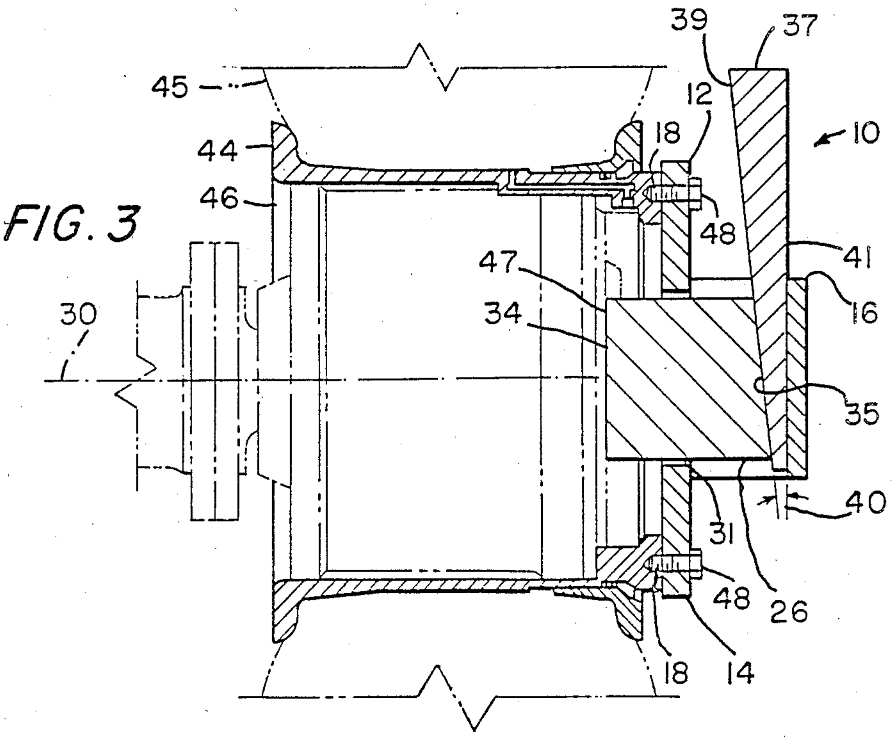

WHEEL PULLER

This invention relates to a means and method for removing a wheel from a rim, particularly to wheels on large equipment such as trucks or industrial machinery.

One of the usual problems encountered in the removal of tires and wheel rims on large vehicles is that because of the size of the rims and tires there is a large contact surface area between the wheel rim and the hub upon which it is mounted that usually oxidizes. Such oxidation and the friction between the wheel rim and the hub create a bond that has been found extremely difficult to break.

In the prior art, devices such as large hydraulic jacks are used but even these do not always work. In some cases dynamite charges have been used to blast the rim off the hub. With this invention, a simple method and device is provided that enables any person to readily and easily remove the largest wheel rim from a hub and do so with very little risk and with the use of very little force. Other advantages and objects of this invention will be apparent from the following description.

FIG. 1 is a front view of a wheel puller according to this invention;

FIG. 2 is a bottom view of the wheel puller shown in FIG. 1 with a portion shown in cross-section taken along line II—II in FIG. 1;

FIG. 3 is a side cross-sectional view of a wheel and hub assembly and a side cross sectional view of the wheel puller shown in FIG. 1 taken along line III—III of FIG. 1 mounted on the wheel and hub assembly and in a wheel pulling position;

Figure 4:
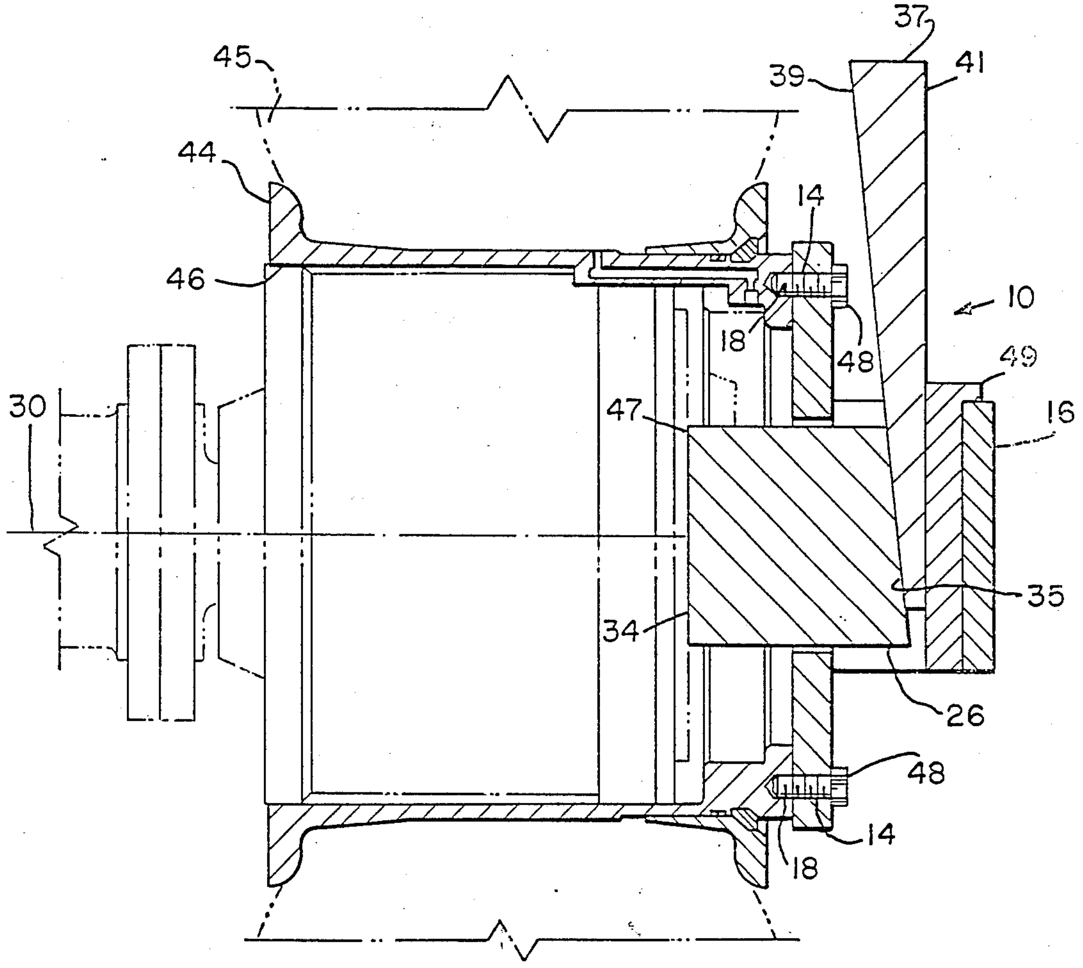
FIG. 4 is a view similar to FIG. 3 showing the wheel-puller in another wheel pulling position.

Referring to FIGS. 1, 2 and 3, a wheel puller comprises a circular base plate 12 having slots 31 and 32 and having bolt holes 14 that are positioned to line up with tapped bolt holes 18 already present in the wheel rims of a typical wheel and tire assembly or placed there to enable the use of this wheel puller. A back plate 16 is welded to a set of four connecting plates 21, 22, 23, and 24 that are similarly welded to base plate 12 to place the back plate at a spaced apart selected distance from the wheel hub when mounted on a wheel hub, as shown in FIG. 3. A blocking wedge 26 is positioned to pass through slot 31 in base plate 12 and a blocking wedge 27 is positioned to pass through slot 32.

The blocking wedges are spaced apart from each other on either side of an axis 30 of the wheel hub and the wheel and tire assembly. Each blocking wedge has a flat surface 34 that is designed to abut a wheel hub assembly and a slanted or inclined plane surface 35 that has a selected inclined plane or widge angle 40 of about six degrees which is selected to provide inclined plane leverage and to insure that the wedges will be retained in position as they are driven in during operation. Driving wedges 37 and 38 are inserted between block wedges 26 and 27, respectively, and back plate 16 and have an inclined plane surface 39 with a wedge angle the same as the blocking wedges. The driving wedges engage inclined plane surfaces 35 of the block wedges at inclined plane surfaces 39 and back plate 16 at a normal surface 41 and extend longitudinally beyond the back plate.

Referring to FIGS. 3 and 4, puller assembly 10 is mounted on a wheel rim 44 that retains a tire 45. Wheel rim 44 is mounted on a typical wheel hub assembly 46 and has bolt holes 18 for receiving mounting bolts 48 and a hub surface 47 that is abutted by block wedges 26 and 27.

In operation, the wheel puller assembly is mounted on the hub by using mounting bolts 48 to connect the wheel puller assembly to the wheel rim and hold the wheel puller assembly in place. Driving wedges 37 and 38 are inserted between block wedges 26 and 27, respectively, and back plate 16.

After mounting the wheel puller by fastening mounting bolts 48 through base plate 12 onto wheel rim 44, the mounting bolts are tightened, and driving wedges 37 and 38 are greased on the sliding inclined plane surfaces 39 and normal surfaces 41 and respectively inserted between wedge blocks 26 and 27 and back plate 16.

A light hammer in the range of two pounds is then used to alternately tap the top of the driving wedges to drive them downwardly (as shown). The weight of the hammer is not critical but it should be a light hammer to obtain optimum results. The wedges are alternately tapped to separate the base plate from the hub and continues until the wheel is free or until the wedges have been driven down to a position where further driving is not possible, that is, when the top of the driving wedges are adjacent to the top of the back plate.

In this situation, as shown in FIG. 4, the sliding wedges are removed and wedge spacers 49 are inserted between back plate 16 and each of the wedge blocks. The driving wedges are inserted between the wedge blocks and the wedge spacers and are again driven down into position to pull the wheel away from and off the hub rim.

I claim:

1. A wheel puller for removing a wheel rim from a wheel hub having a center axis, said puller comprising:
- a base plate adapted to be connected to a wheel rim;
- a back plate connected to the base plate and positioned to extend across the center axis of a wheel hub and to be spaced apart from a wheel hub at a selected distance when the base plate is connected to a wheel rim on a wheel hub;
- two block wedges having selected wedge angles extending between the wheel hub and the back plate;
- two driving wedges positioned between each respective block wedge and the back plate and having an inclined plane surface engaging the block wedges and extending longitudinally beyond the back plate to enable wedging movement of the driving wedges to separate the plate and wheel rim from the hub.

2. A wheel puller according to claim 1 wherein said selected wedge angles are about six degrees.

3. A wheel puller according to claim 1 wherein said block wedges are laterally spaced apart from each other on either side of the center axis of the wheel hub.

4. A wheel puller according to claim 3 wherein said selected wedge angles are about six degrees.

5. A wheel puller according to claim 1 also comprising two spacer plates having a selected thickness positioned respectively between each driving wedge and the back plate.

6. A process for removing a wheel rim from a wheel hub comprising:
- attaching a plate to the wheel rim with said plate positioned to be spaced apart from the wheel hub;
- inserting two block wedges having inclined planes of a selected wedge angle between the plate and the wheel and spaced apart from each other;

inserting two driving wedges having inclined planes of the selected wedge angle between the block wedges and the plate and engaging the block wedges and the plate to provide wedging action upon insertion of the driving wedges between the block wedges and the plate; and alternately tapping with a light hammer the two driving wedges to move the plate away from the wheel hub thereby removing the wheel rim from the wheel hub.

7. A process according to claim 6 wherein said selected wedge angle is about six degrees.

8. A process according to claim 6 wherein said hammer weighs generally in the range of about two pounds.

9. A process according to claim 7 wherein said hammer weighs generally in the range of about two pounds.

10. A wheel puller for removing a wheel rim from a wheel hub having a center axis, said puller comprising:

a back plate;

a means for connecting the back plate to a wheel rim to position the back plate to extend across the center axis of a wheel hub and to be spaced apart from a wheel hub at a selected distance when connected to a wheel rim on a wheel hub;

two block wedges having selected wedge angles extending between the wheel hub and the back plate;

two driving wedges positioned between each respective block wedge and the back plate and having an inclined plane surface engaging the block wedges and extending longitudinally beyond the back plate to enable wedging movement of the driving wedges to separate the plate and wheel rim from the hub.

11. A wheel puller according to claim 10 wherein said block wedges are laterally spaced apart from each other on either side of the center axis of the wheel hub.

12. A wheel puller for removing a wheel rim from a wheel hub having a center axis, said puller comprising:

a base plate;

a means for connecting the base plate to a wheel rim at a selected position on the wheel rim;

a back plate connected to the base plate and positioned to extend across the center axis of a wheel hub and to be spaced apart from a wheel hub at a selected distance when the base plate is connected to a wheel rim on a wheel hub;

two block wedges having selected wedge angles extending between the wheel hub and the back plate;

two driving wedges positioned between each respective block wedge and the back plate and having an inclined plane surface engaging the block wedges and extending longitudinally beyond the back plate to enable wedging movement of the driving wedges to separate the plate and wheel rim from the hub.

* * * * *